United States Patent [19]

Patton et al.

[11] 4,065,872
[45] Jan. 3, 1978

[54] RECEPTACLE FOR INSECTICIDE OR REPELLENT

[75] Inventors: Phillips E. Patton, Baton Rouge, La.; Norman A. Freeman, Fullerton, Calif.

[73] Assignee: VCA Corporation, Baton Rouge, La.

[21] Appl. No.: 695,419

[22] Filed: June 14, 1976

[51] Int. Cl.² ............................................. A01M 1/20
[52] U.S. Cl. .................................................. 43/131
[58] Field of Search ......................................... 43/131

[56] References Cited

U.S. PATENT DOCUMENTS

| | | | |
|---|---|---|---|
| 2,219,403 | 10/1940 | Sennewald | 43/131 |
| 2,547,314 | 4/1951 | Grant | 43/131 |
| 2,825,996 | 3/1958 | Grant | 43/131 |
| 2,893,160 | 7/1959 | Grant | 43/131 |

*Primary Examiner*—Louis G. Mancene
*Assistant Examiner*—Daniel J. Leach
*Attorney, Agent, or Firm*—Donald L. Johnson; John F. Sieberth; E. Donald Mays

[57] ABSTRACT

A holding device for retaining insecticide material for insects such as ants, or for holding repellent material for insects or dogs. The device includes an elongated stake, preferably pointed on one end, and having a generally rectangular recessed area at the other end. A holding cup for the insecticide or repellent material is received in the recessed area of the upper end of the stake. The cup provides an opening in its rear surface for access by the insects to the material contained therein.

2 Claims, 7 Drawing Figures

U.S. Patent   Jan. 3, 1978   4,065,872
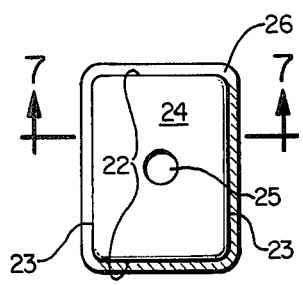
FIG. 6.
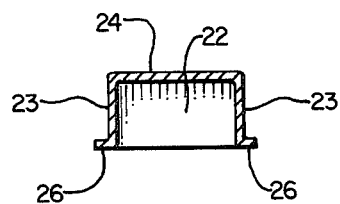
FIG. 7.
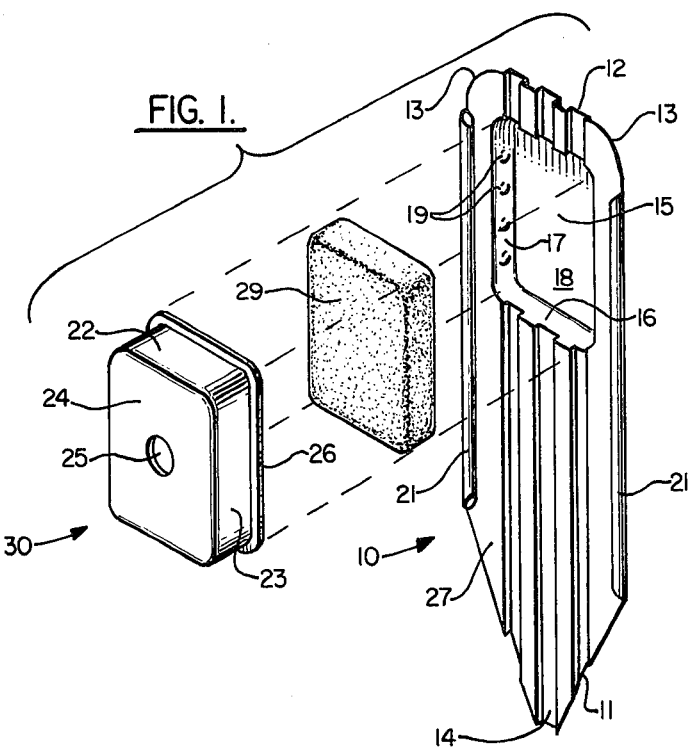
FIG. 1.
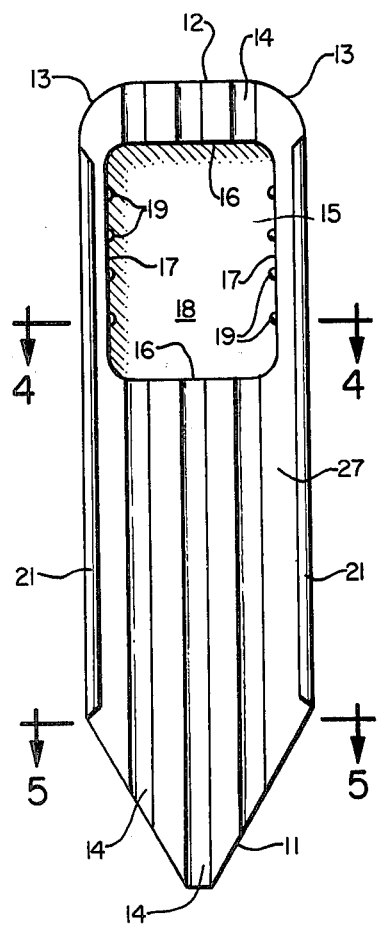
FIG. 2.   FIG. 3.
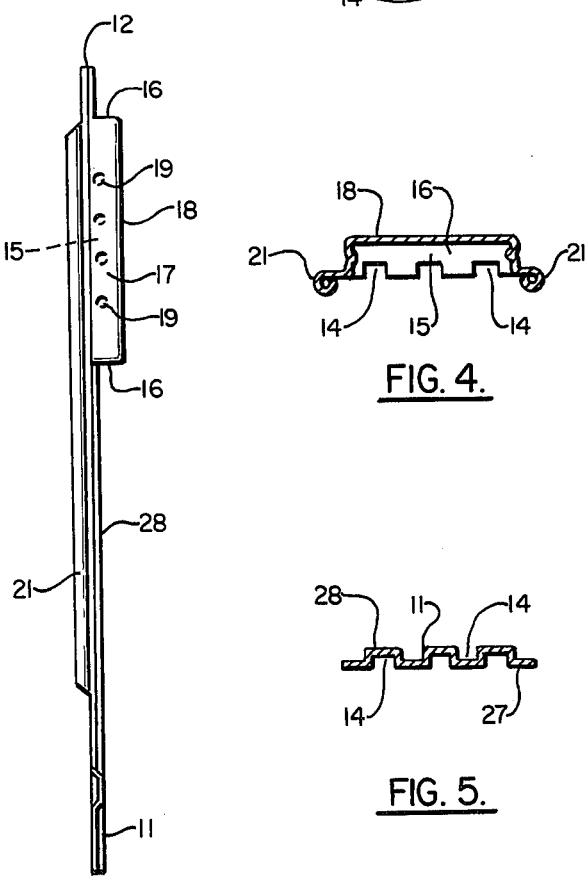
FIG. 4.
FIG. 5.

RECEPTACLE FOR INSECTICIDE OR REPELLENT

BACKGROUND OF THE INVENTION

1. Field of the Invention

This invention relates to a device for holding insecticide or repellent material.

2. Description of the Prior Art

Insecticide containers of the type which are used to retain poison bait material for insects such as ants, roaches and the like have been in use for many years. Some of these devices are made of cylindrical tubes, the bait being placed at a spot in the tube so the insect can crawl through the rube and feed on the bait. Other devices use poison bait contained in cans which have openings on their sides permitting access to the poison by the crawling insects. Invasion of residence by ants seeking food has been a continuous problem over the years. Numerous ant poison bait devices have been devised for placing around the exterior of the home or on the interior at appropriate entry places to entice the ants into eating the bait and dying. Examples of insecticide containers particularly adapted for holding poison bait for ants are shown in U.S. Pat. Nos. 2,547,314; 2,825,996; and 2,893,160. Some of the ant poison devices shown in the foregoing patents have been commercially produced and marketed for a number of years. The foregoing insecticide containers are generally two-piece devices, including a stake or support member and a bait cup or container which is attached to the upper end of the stake. Generally, the bait cup or container is attached to the stake by means of tabs which are bent over and locked to the upper end of the stake to retain it thereon. The cup is generally provided with a hole in the exterior to permit access to the poison bait. Additionally, the stakes are generally corrugated to provide the ants access to the bait from the underside of the bait cup through the grooves provided by the corrugations.

Containers of the foregoing type are also used to hold repellent material which effectively keeps dogs from closely approaching areas such as shrubs or flower gardens.

While the foregoing types of insecticide or repellent containers have found ready acceptance in the marketplace, nevertheless, their manufacture and construction have posed considerable problems. To assemble the devices, it is necessary to provide notches on the stakes and tabs on the cups and to bend the tabs over the stakes to securely attach the insecticide cup to the stake. This assembly has conventionally been done by hand, thus exposing the workers to the danger of cuts from the sharp metal tabs on the cups and notches in the stakes.

Thus, it can be seen that there is a real need in the insecticide or repellent container market, particularly the ant poison bait and dog repellent container market, to provide a container which is readily and economically manufactured and yet which can be assembled without danger of the worker's being injured by hand assembly of the cup and stake portions of the container.

SUMMARY OF THE INVENTION

It is an object of the present invention to provide an insecticide or repellent container which can be economically manufactured and readily assembled without danger to the production workers.

A further object of the present invention is to provide an insecticide aor repellent container which is effective in providing ready access to the poison bait by the insect.

A further object of the present invention is to provide an insecticide or repellent container which will protect the poison bait or repellent material from ready access by children and pets.

The above and other objects of the present invention are realized in an insecticide-holding device including an elongated support means having a generally planar surface adjacent its upper end. A recessed area is provided on one side of the planar surface. An insecticide or repellent container is received in the recessed area and cooperating means are provided on the support means and on the insecticide container for securing the container to the support means.

BRIEF DESCRIPTION OF THE DRAWINGS

FIG. 1 is an exploded perspective elevational view of the receptacle of the present invention;

FIG. 2 is a top plan view of the support member or stake portion of the receptacle of the present invention;

FIG. 3 is a side view of the support or stake shown in FIG. 2;

FIG. 4 is a cross-sectional view of FIG. 2 along line 4—4;

FIG. 5 is a cross-sectional view of FIG. 2 along line 5—5;

FIG. 6 is a bottom plan view of the cup or container portion of the receptacle of the present invention; and FIG. 7 is a cross-sectional view of the cup of FIG. 6 along line 7—7.

DESCRIPTION OF THE PREFERRED EMBODIMENTS

The insecticide or repellent receptacle of the present invention includes an elongated support or stake, designated generally by the numeral 10. The lower end 11 of the stake is preferably pointed to permit easy insertion into the earth. The upper end 12 of the stake is provided with generally rounded corners 13—13. As seen in FIGS. 2 and 3, the front 27 and back 28 surfaces of the elongated stake 10 are provided with a plurality of generally U-shaped corrugations 14 which extend longitudinally over the stake. While the corrugations as shown in the drawings are generally U-shaped, it is understood that these corrugations may be accurate, semicircular, or any other suitable shape.

While the stake may be readily made without corrugations, corrugations are generally preferred since they may be used to provide feeding troughs for ants under certain conditions. Corrugations also permit the gauge of the metal used to produce the stake to be reduced and thus to effect economies in the manufacture of the insecticide receptacle, yet provide a stake which is strong enough to be driven into the ground.

Adjacent the upper end of the stake, there is provided a generally rectangular recess 15 in the front surface 27 of the stake. The recess is defined by interconnected and continuous opposing end walls 16—16, opposing sidewalls 17—17 and a bottom wall 18. A plurality of inwardly projecting protrusions 19 are formed in the opposing sidewalls 17—17.

Preferably, the longitudinally extending edges of the support stake 10 are provided with a roll or curl 21 to provide added strength and to minimize the danger of cuts from the sharp edge of the stake.

Referring now to FIGS. 1, 6 and 7, the insecticide receptacle of the present invention includes an insecticide or a repellent container or cup designated generally by the numeral 30 that holds the insecticide such as a poison bait 29 and is adapted to be received in the recess 15 in the stake. The open-ended container is preferably formed in a generally rectangular shape having end walls 22—22 and sidewalls 23—23 integrally connected together which are, in turn, connected to a bottom wall 24.

A cylindrical opening 25 is provided in the bottom wall 24 of the container. The peripheral edge of the open end of the container is provided with an outturned, generally flat flange 26 as seen more clearly in FIGS. 6 and 7.

The support or stake 10 of the receptacle can be conveniently formed from strip metal stock by blanking or press forming. While the invention has been described thus far as using metal to form the container and support, they could be formed readily from plastic material (e.g., polyethylene, polystyrene) by injection molding or other suitable means.

In the assembly of the receptacle of the present invention, the container or cup 30 is filled with the desired poison bait, insecticide-containing material, or repellent material, depending upon the use intended for the device. When the device is to be used as an ant poison holder, the cup or container 30 can be filled with a suitable material such as a gelatinized mass containing a suitable ant insecticide, for example, arsenic trioxide, or other suitable poison. If the insecticide receptacle is desired to be used for attracting and poisoning roaches or other common household insects, other suitable poison baits can be placed in the container or cup 30. Also, the container can be used for holding insect repelling material or material which vaporizes to kill flying insects such as flies and mosquitoes.

After the container or cup is filled with the desired material, the cup is snapped into the recess 15 in the stake 10 so that the two opposed, longitudinally extending, outturned edges 26 of the container are retained beneath the two rows of protrusions 19—19 on each of the sidewalls 17—17 of the recessed area in the stake. This operation can be conveniently done by hand or by automated machinery.

In normal use, the receptacles are either placed in the ground adjacent the points of entry of the ants into the house, or placed in other locations for ready access by insects, or, if used to hold dog repellent material, they are placed in flower beds or in adjacent shrubbery. When filled with ant poison, the ants feed on the poison bait through hole 25 and also the corrugations 14. The corrugations will accumulate poison bait as it is partially solubilized by rain and/or lawn sprinkling working into the cup and carrying poison bait into the corrugations when the device is used outside the residence.

While an adequate description of preferred embodiments of the present invention has been shown and described for the purpose of illustrating the invention, it will be quite apparent to those skilled in the insecticide receptacle art that numerous changes and modifications can be made to the insecticide receptacle without departing from the spirit and scope of the invention. For example, the recess in the stake and the cup can be generally cylindrical rather than rectangular as shown, if desired. Also, means other than the rows of projections may be used to attach the cup to the stake. Further modifications can be readily made to the dispenser to allow the product being dispensed to be more or less accessible to the insects or to modify the rate at which the material in the receptacle is dispensed.

What is claimed is:

1. An insecticide or repellent holding device comprising: an elongated support means having a generally planar surface adjacent its upper end; a recessed area being provided on one side of said planar surface; an insecticide container received in said recessed area; said recess and said container both being generally rectangularly shaped and said container having a rear wall connected to sidewalls which have a depth greater than said recess, a portion of which sidewalls are received in said recess; and said recess being defined by opposed pairs of interconnected sidewalls connected to a planar bottom wall, at least one pair of sidewalls being provided with inwardly extending protrusions, the corresponding sidewalls of said container being provided with outwardly turned edges adapted to be engaged by said protrusions to secure said container within said recess.

2. The holding device of claim 1 wherein said elongated support means has longitudinally extending edges which are rolled or curled to provide added strength and to minimize the danger of cuts from the edges of the holding device.

* * * * *